(12) United States Patent
O'Brien

(10) Patent No.: US 6,893,099 B2
(45) Date of Patent: May 17, 2005

(54) TAILGATE

(76) Inventor: George M. O'Brien, 5095 Verbena Dr., Acworth, GA (US) 30102

( * ) Notice: Subject to any disclaimer, the term of this patent is extended or adjusted under 35 U.S.C. 154(b) by 0 days.

(21) Appl. No.: 10/605,522

(22) Filed: Oct. 6, 2003

(65) Prior Publication Data

US 2005/0073188 A1 Apr. 7, 2005

(51) Int. Cl.$^7$ .................................................. B60P 1/26
(52) U.S. Cl. ................ 298/23 D; 298/23 F; 298/23 DF; 296/56
(58) Field of Search ........................ 298/23 MD, 23 F, 298/23 D, 23 DF; 296/56

(56) References Cited

U.S. PATENT DOCUMENTS

| | | | | |
|---|---|---|---|---|
| 665,137 A | * | 1/1901 | Shadbolt | 298/17 R |
| 1,097,395 A | * | 5/1914 | Cullen | 296/56 |
| 1,790,379 A | * | 1/1931 | Hughes | 296/51 |
| 2,208,691 A | * | 7/1940 | Veth | 16/371 |
| 4,678,235 A | * | 7/1987 | Hagenbuch | 298/23 DF |
| 5,249,843 A | * | 10/1993 | Hagenbuch et al. | 298/23 DF |
| 6,499,808 B2 | * | 12/2002 | Palmberg, Jr. | 298/23 MD |
| 6,726,288 B2 | * | 4/2004 | Hagenbuch | 298/23 D |

OTHER PUBLICATIONS

Declaration of George M. O'Brien, Dec. 30, 2003, 2 pages.

* cited by examiner

Primary Examiner—Stephen Gordon
(74) Attorney, Agent, or Firm—Sutherland Asbill & Brennan LLP

(57) ABSTRACT

A tailgate for use with a vehicle having a chassis and a truck bed. The truck bed has an inside surface and an outside surface. The tailgate may include a pair of mounting blocks positioned on the outside surface of the truck bed. Each of the mounting blocks may include a protrusion. The tailgate also may have a pair of arms. Each of the arms may be positioned on a protrusion for rotation thereabout. A pair of chains may attach each of the arms to the chassis.

17 Claims, 4 Drawing Sheets

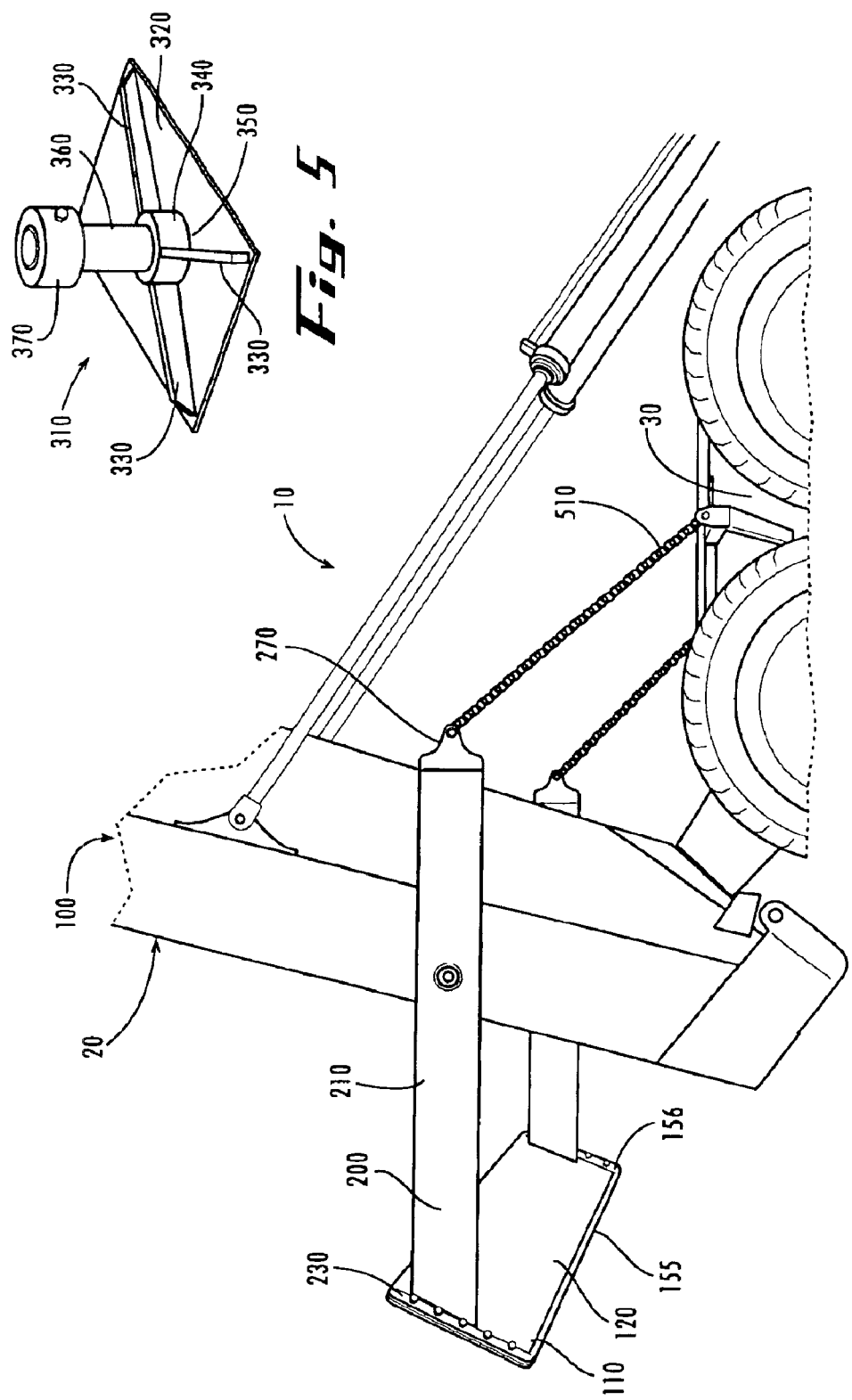

TAILGATE

TECHNICAL FIELD

The present invention relates generally to tailgates and more specifically relates to tailgates for haulers, dump trucks, and the like.

BACKGROUND OF THE INVENTION

Haulers, dump trucks, and similar types of vehicles may use a tailgate so as to reduce spills while hauling materials. Commonly, the tailgate is hung over the dump bed such that the gate swings out of the way when the bed is raised so as to permit dumping, i.e., an overhung tailgate.

For example, Volvo Construction Equipment North America of Ashville, N.C., sells a line of articulated haulers under the designations "A25D", "A30D", "A35D", and "A40D." One piece of optional equipment is a wire operated overhung tailgate. Although the tailgate is adequate for preventing spills of material from the bed, the required maintenance and the durability of the tailgate may be problematic. For example, the wires that attach the tailgate to the chassis of the truck may snap, rendering the tailgate unusable. Second, the arms of the tailgate may be made out of metal plate. The metal plate, however, is subject to bending, also rendering the operation of the tailgate problematic. Further, the arms of the tailgate are attached to the bed and rotate about a set of bearings. These bearings required routine maintenance and also may be subject to failure. What is desired, therefore is a tailgate for a hauler, dump truck, and the like that is durable and easy to maintain. The tailgate preferably is relatively inexpensive to manufacture and to install.

SUMMARY OF INVENTION

The present invention thus provides a tailgate for use with a vehicle having a chassis and a truck bed. The truck bed has an inside surface and an outside surface. The tailgate may include a pair of mounting blocks positioned on the outside surface of the truck bed. Each of the mounting blocks may include a protrusion. The tailgate also may have a pair of arms. Each of the arms may be positioned on a protrusion for rotation thereabout. A pair of chains may attach each of the arms to the chassis.

The tailgate further may include a gate mounted on the arms. The gate may include an elongated metal plate. Reinforcing members may be positioned on the elongated plate. A support member may be positioned on the elongated plate such that the support member rests on the truck bed.

The arms may include tubular members. The arms may include steel of about 0.1875 inches in wall thickness. The arms may be substantially rectangular in shape. The arms may include an aperture therein so as to mate with the protrusion. The arms also may include a chain attachment positioned thereon.

The mounting block may be welded to the outside surface of the truck bed. The base plate may include reinforcing members positioned thereon. The protrusion may be a metal pin. A collar may be positioned on the protrusion so as to keep each of the arms in place.

A pair of chain supports may be positioned on the chassis such that each of the chain supports attaches one of the chains to one of the arms. The chain supports each may include an extending member such that the chain is positioned outside of the truck bed. The chains may include chain link.

A further embodiment of the present invention may provide a vehicle with a chassis. The vehicle may include a dump bed mounted on the chassis, a pair of mounting blocks mounted on either side of the dump bed, a tailgate positioned on the mounting blocks for rotation about the dump bed, and a pair of chains attaching the tailgate to the chassis. The tailgate may include a pair of tubular arms. The mounting blocks may be in the form of a pin. The tailgate may include a reinforced gate. A support member also may be positioned on the tailgate such that the support member rests on the dump bed.

The method of the present invention may provide for attaching a tailgate to a dump bed of a vehicle, with the dump bed being positioned on the chassis of the vehicle. The method may include the steps of attaching a mounting pin to both sides of the dump bed, mounting the tailgate on the mounting pins, attaching a collar to each of the mounting pins so as to keep the tailgate in place, and attaching a pair of chains to the tailgate and the chassis. The collar may be attached by a pin.

These and other features of the present invention will become apparent upon review of the following detailed description of the preferred embodiments when taken in conjunction with the drawings and the appended claims.

BRIEF DESCRIPTION OF DRAWINGS

FIG. 5 is a perspective view of a mounting block of the tailgate of FIG. 3.

FIG. 6 is a side plan view of the tailgate of FIG. 3 with the bed extended.

DETAILED DESCRIPTION

Figure 1:
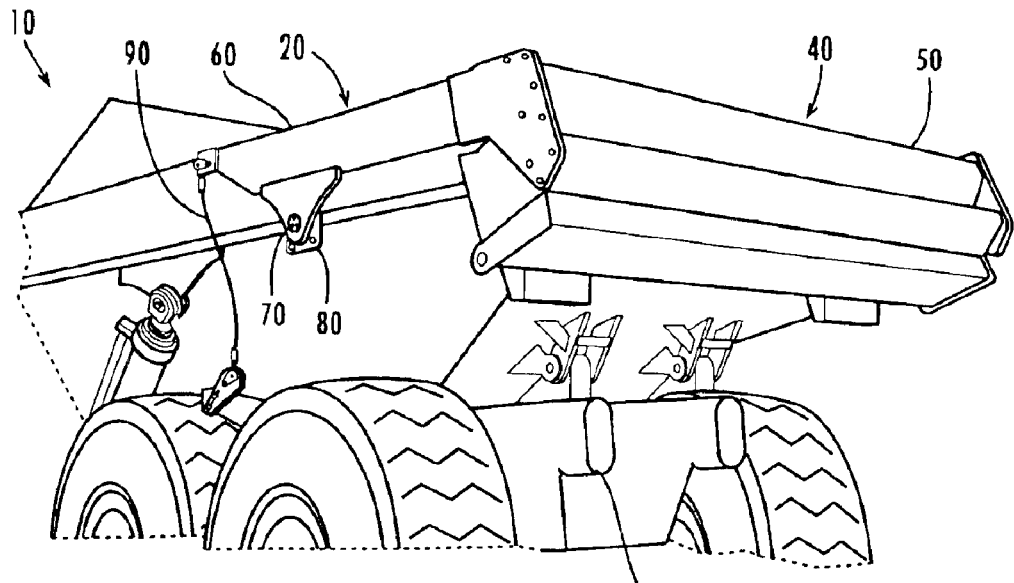
FIG. 1 is a perspective view of an existing tailgate system.
Figure 2:
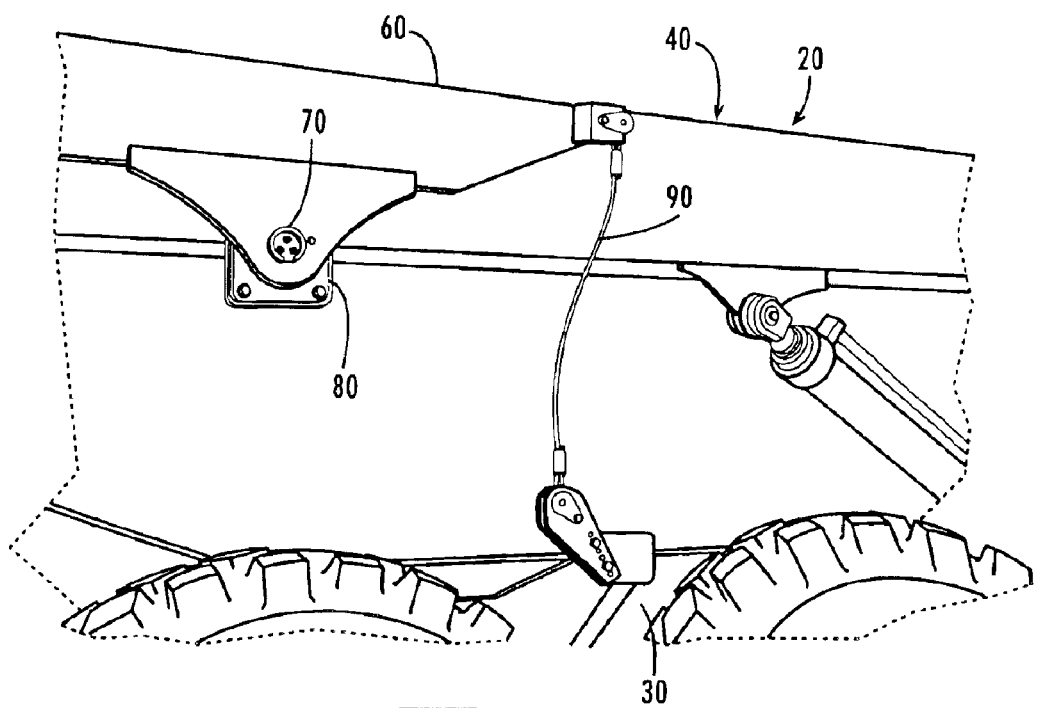
FIG. 2 is a further perspective view of the existing tailgate of FIG. 1.
Figure 3:
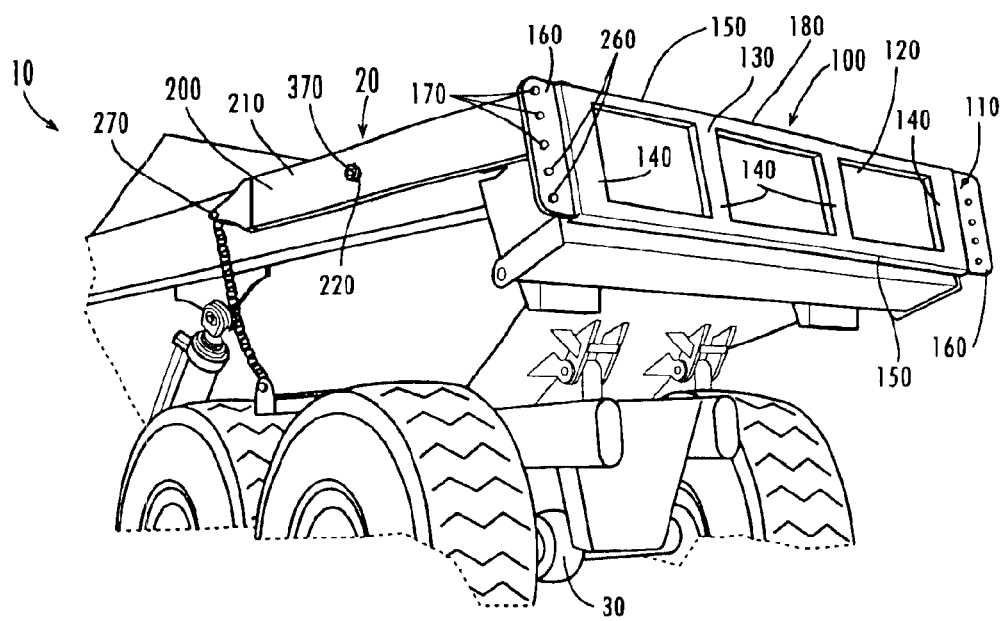
FIG. 3 is a perspective view of the tailgate of the present invention.
Figure 4:
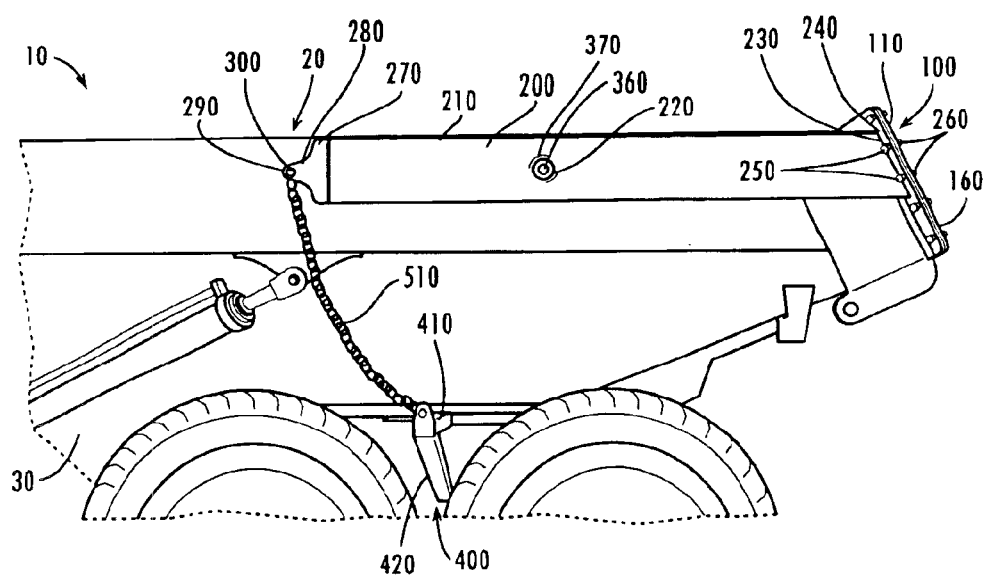
FIG. 4 is a side plan view of the tailgate of FIG. 3.
Figure 7:
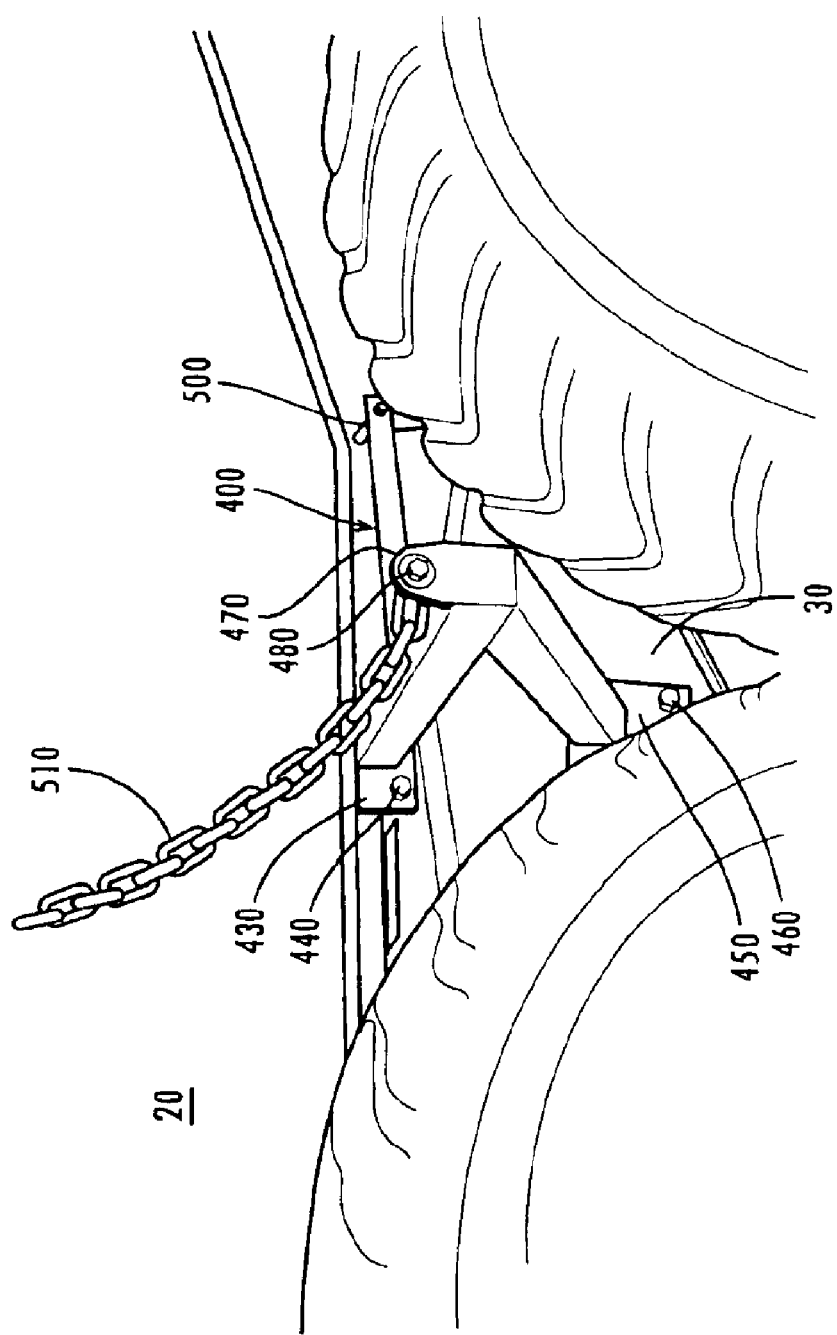
FIG. 7 is a perspective view of the chain attachment of the tailgate of FIG. 3.

Referring now to the drawings, in which like numerals refer to like elements throughout the several views. FIGS. 1 and 2 show a vehicle 10 with a dump bed 20 mounted on a chassis 30. The present invention may be used with any type of vehicle 10, dump bed 20, or chassis 30.

A known tailgate 40 is attached to the dump bed 20. The tailgate 40 includes a gate 50 mounted onto the dump bed 20 by a pair of arms 60. The gate 50 and the arms 60 may be made out of metal plate. For example, the plate may be about one (1) inch thick and made out of steel, such as A-36 steel, or similar types of materials. The tailgate 40 may rotate about the dump bed 20 via a set of bushings 70. The bushings 70 generally may be loaded with bearings. A plate 80 welded or otherwise attached to the dump bed 20 may support each the bushings 70. Rotation of the tailgate 40 as the dump bed 20 is raised may be limited by a wire 90 attached to each arm 60. The wires 90 may be attached to the chassis 30 of the vehicle 10 and to each of the arms 60.

FIGS. 2–6 show an improved tailgate 100 of the present invention. The tailgate 100 may include a gate 110. The gate 110 may include an elongated plate 120. The elongated plate 120 may be a metal plate. The metal plate may be made out of steel or similar types of materials. In this example, the plate 120 may be about 0.375 inches thick, about 115.5 inches long, and about 29 inches high. The dimensions of the elongate plate 120, however, may vary with the dimensions of the dump bed 20 and may be sized accordingly.

The plate 120 may be reinforced with tubing 130. In this example, the tubing 130 may extend around the periphery of the plate 120. Specifically, the tubing 130 may include one or more vertical members 140 and one or more horizontal members 150 that encircle the plate 120 and also provide support ribs. In this example, the tubing 130 may be about three (3) inches in width, about 3 inches in depth, with about 0.1875 inches in wall thickness. The tubing 130 may be substantially rectangular in shape. The tubing 130, however, may have any desired shape or dimension. Further, multiple support ribs or tubing 130 may be used. The tubing 130 may be welded to the plate 120 via stitch welding or similar types of joinder means. The tubing 130 reinforces the plate 120 and prevents the plate 120 from being bent or damaged.

The inside surface of the elongated plate 120 also may have a support member 155 extending along the length of the plate. The support member 155 may be identical or similar to the tubing 140 described above and may be welded to the plate 120. The support member 155 may be positioned about 0.5 inches from the bottom of the plate 120 so as to nest with the dump bed 20. An angled plate 156 may be positioned on top of the support member 155. The plate 156 may be about three (3) inches in length and may have an angle of about forty-five degrees. The plate 156 may prevent dirt or other materials from accumulating on the support member 155.

Welded to each side of the plate 120 may be a pair of side plates 160. The side plates 160 may be solid welded to the plate 120 or connected by similar types of joinder means. The side plates 160 may include a metal plate as described above of about 0.5 inches in thickness. Any shape or dimension may be used. A number of bolt holes 170 may be positioned within the side plates 160. A lifting eye 180 may be attached to the top of the plate 120.

The tailgate 100 also may include a pair of arms 200. Each arm 200 may be made out an elongated tube 210. The tube 210 may be made from steel or similar types of materials. The tube 210 may be about twelve (12) inches in height, about two (2) inches in depth, and may have a wall thickness of about 0.1875 inches. The length and other dimensions of the tube 210 may depend upon the overall dimensions of the dump bed 20 and the vehicle 10 as a whole. The elongated tube 210 may be substantially rectangular in shape, although other shapes may be used.

Each arm 200 may include an aperture 220 therethrough as will be described in more detail below. In this example, the aperture 220 may be spaced about 63 inches from one end of the arm 200. The position of the aperture 220 may depend upon the dimensions of the dump bed 20 and the vehicle 10 as a whole.

One end of each elongated tube 210 may include a tapered end 230. In this example, the tapered end 230 may have an angle of about 22.5 degrees. The amount of the taper may depend upon the dimensions of the dump bed 20 and the vehicle 10 as a whole. Any desired angle may be used. An end plate 240 may be welded or otherwise attached to the tapered end 230. The end plate 240 may be a metal plate as described above of about 0.5 inches thick. Any desired shape or dimension may be used. The end plate 240 may have a number of bolt holes 250 therein. The end plate 240 of the arm 200 may align with the side plate 160 of the gate 110 and may be attached by a number of bolts 260 or other type of joinder means.

The other end of the arm 200 may include a chain attachment 270. The chain attachment 270 may include two (2) end plates 280. The plates 280 may be welded or otherwise attached to the arm 200. The plates 280 may be made out of metal plate as described above of about 0.5 inches thick. The plates may 280 include an aperture 290 therein. A rod 300 may be positioned within the apertures 290. The plates 280 may be connected by a further plate or other elements so as to stiffen the overall chain attachment 270.

Each arm 200 may rotate about the dump bed 20 via a mounting block 310. Each mounting block 310 may be welded or otherwise attached to the outer surface of the dump bed 20. The mounting block 310 may be attached via about three passes of 7018 welding rod from top to bottom. Similar types of joinder means also may be used.

Each mounting block 310 may have a base plate 320. The base plate 320 may be made out of metal plate about 0.5 inches thick. Steel or similar types of metals may be used. The base plate 320 in this example may be about sixteen (16) inches long and about ten (10) inches high. The dimensions of the base plate 320 may vary with the dimensions of the dump bed 20, the vehicle 10 as a whole, and the arms 200. Any desired shape or dimension may be used.

The base plate 320 may have a plurality of reinforcing ribs 330. In this example, four (4) ribs 330 may be used. The ribs 330 may be welded to the base plate 320 or otherwise attached. The ribs 330 may be made out of a metal bar of about one (1) inch in height and about a half (0.5) inch in depth. Any desired shape or dimension may be used.

The base plate 320 may have an aperture of 340 therein. In this example, the aperture 340 may have a diameter of about three (3) inches. A collar 350 or a similar structure may surround the aperture 340. The collar 350 may be about 1.125 inches in length. The collar 350 also may be made of a metal bar as is described above. The collar 350 may be welded to the base plate 320 or otherwise attached. A pin 360 may be inserted within the aperture 340 and the collar 350. The pin 360 may be welded therein or otherwise attached. The pin 360 also may be made out of metal as is described above. The pin 360 may have a diameter of about three (3) inches so as to align with the diameter of the aperture 340. The pin 360 may be about seven (7) inches long. The aperture 340, the collar 350, and the pin 360, however, may have any desired shape or dimension.

Each arm 200 may be mounted on the mounting block 310 by aligning the pin 360 of the mounting block 310 with the aperture 290 within each arm 200. Once the arms 200 are mounted, a second collar 370 may be attached to the pin 360 and secured via an attachment pin passing through the collar 370. The collar 370 also may be welded to the pin 360 or otherwise attached. The collar 370 keeps the arm 200 in place on the pin 360. The second collar 370 may be similar to the first collar 350 in material, size, and dimension.

Attached to both sides of the chassis 30 of the vehicle 10 may be a chain support 400. The chain support 400 may include an extending member 410 and a support member 420. The extending member 410 and the support member 420 may be made out of metal tubing. The metal tubing may be substantially rectangular in shape. The metal tubing may be made out of steel or similar types of materials. The tubing may be about three (3) inches in thickness and about three (3) inches in depth. The extending member 410 and the support member 420 may have any convenient length. Any desired shape or dimension may be used. The dimensions of the extending member 410 and the support member 420 may vary with the dimensions of the dump bed 20 and the vehicle 10 as a whole. The extending member 410 and the support member 420 may be welded or otherwise attached to each other. The extending member 410 extends beyond or in alignment with the arms 200.

An extending member plate 430 may be welded or otherwise attached to the extending member 410. The plate 430 may be made out of steel or similar types of materials. The plate 430 may have a number of apertures 440 therein. The support member 420 also may have a support member plate 450 welded or otherwise attached thereto. The plate 450 also may be made out of steel or similar types of materials. The plate 450 also may have a number of apertures 460 therein. The extending member 410 and the support member 420 may be attached to the chassis 30 of the vehicle 10 or otherwise via bolts or similar types of attachment means as connected through the apertures 440, 460 of the plates 430, 450. Similar types of attachment means also may be used.

A pair of chain plates 470 may be welded or otherwise attached to the far end of the extending member 410. The chain plates 470 may extend above the extending member 410. The chain plates 470 each may have an aperture 480 therein. A bolt or similar types of attachment means may be position within the aperture 480.

The chain support 400 also may have a horizontal support member 500. The horizontal support 500 may be positioned between the chassis 30 and the extending member 410. The horizontal support member 500 may be attached to the chassis 30 and/or the extending member 410 by bolts, welding, or similar types of joinder means.

Positioned between the chain attachment 270 of each arm 200 and the chain plates 470 of the chain supports 400 may be a chain 510. The chain 510 preferably is made from steel or similar types of materials. In the example, the chain 510 is in the form of chain-link. The chain 510 generally limits the advance of the dump bed 20 as it is raised.

In use, the existing tailgate 40 of the vehicle 10 (if one is present) is removed. The mounting block 310 is then welded or otherwise attached to both sides of the dump bed 20. The arms 200 are then positioned on the mounting block 310 as the aperture 220 of each arm 200 is positioned about the pin 360 of the mounting block 310. The second collar 370 then may be attached. The chain 510 then may be attached between the chain attachment 270 of each arm 200 and each chain support 400.

As is shown in FIG. 6, when the dump bed 20 is elevated, the tailgate 100 rotates about each base plate 320 until the full length of the chain 510 is reached. The tailgate 100 then may swing back under gravity as the dump bed 20 is again lowered. The gate 110 may rest on the dump bed 20 via the support member 155. The use of the elongated tube 210 for the arms 200 provides the tailgate 100 with an increased ability to resist bending and allows the arms 200 to stay largely in alignment. The use of the mounting block 310 advantageously avoids the use of the bushings, the bearings, and the maintenance required with known tailgates 40. Further, the use of the chain 510 largely avoids the breaking of the wire 90 and the complex attachment means previously used. The use of the support member 155 also reduces the stress placed on the chains 510. Finally, the reinforced gate 110 provides increase stability to the tailgate 100 as a whole.

It should be apparent that the foregoing relates only to the preferred embodiments of the present invention and that numerous changes and modifications may be made herein without departing from the spirit and scope of the invention as defined by the following claims and the equivalents thereof.

I claim:

1. A tailgate for use with a vehicle with a chassis and truck bed, the truck bed having an inside surface and an outside surface, comprising:

a pair of mounting blocks positioned on the outside surface of the truck bed;

each of said pair of mounting blocks comprising a protrusion;

a pair of arms;

each of said pair of arms comprising a tubular member:

each of said pair of arms positioned on a respective one of said protrusions for rotation thereabout; and a pair of chains attaching each of said arms to said chassis.

2. The tailgate of claim 1, further comprising a gate mounted on said pair of arms.

3. The tailgate of claim 2, wherein said gate comprises an elongated plate.

4. The tailgate of claim 3, wherein said gate comprises metal plate.

5. The tailgate of claim 3, wherein said gate comprises reinforcing members positioned on said elongated plate.

6. The tailgate of claim 3, wherein said gate comprises a support member positioned on said elongated plate such that said support member rests on the truck bed.

7. The tailgate of claim 1, wherein each of said pair of arms comprises steel of about 0.1875 inches in wall thickness.

8. The tailgate of claim 1, wherein each of said pair of arms comprises a substantially rectangular shape.

9. The tailgate of claim 1, wherein each of said pair of arms comprises an aperture therein so as to mate with said respective protrusions.

10. The tailgate of claim 1, wherein each of said pair of arms comprises a chain attachment positioned thereon for a respective one of said chains.

11. The tailgate of claim 1, wherein each of said mounting blocks is welded to the outside surface of the truck bed.

12. The tailgate of claim 1, wherein each of said mounting blocks comprises a base plate with reinforcing members positioned thereon.

13. The tailgate of claim 1, wherein each of said protrusions comprises a metal pin.

14. The tailgate of claim 1, further comprising a collar positioned on each of said protrusions so as to keep each of said pair of arms in place.

15. The tailgate of claim 1, further comprising a pair of chain supports positioned on said chassis such that each of said chain supports attaches one of said pair of chains to one of said pair of arms.

16. The tailgate of claim 15, wherein each of said pair of chain supports comprises an extending member such that said chain is positioned outside of said truck bed.

17. The tailgate of claim 1, wherein said pair of chains comprises a chain link.

* * * * *